(12) United States Patent
Rockelmann et al.

(10) Patent No.: US 7,950,440 B2
(45) Date of Patent: May 31, 2011

(54) ROLLER BLIND ARRANGEMENT (75) Inventors: Andreas Rockelmann, Munich (DE); Sebastian Glasl, Munich (DE)

(73) Assignee: Webasto AG, Stockdorf (DE)

( * ) Notice: Subject to any disclaimer, the term of this patent is extended or adjusted under 35 U.S.C. 154(b) by 262 days.

(21) Appl. No.: 12/064,744

(22) PCT Filed: Aug. 24, 2006

(86) PCT No.: PCT/DE2006/001485
§ 371 (c)(1),
(2), (4) Date: Feb. 25, 2008

(87) PCT Pub. No.: WO2007/022769
PCT Pub. Date: Mar. 1, 2007

(65) Prior Publication Data
US 2008/0216971 A1 Sep. 11, 2008

(30) Foreign Application Priority Data
Aug. 26, 2005 (DE) .......... 10 2005 040 758

(51) Int. Cl.
*B60J 1/20* (2006.01)

(52) U.S. Cl. .............................. 160/273.1; 160/370.22

(58) Field of Classification Search ............... 160/273.1, 160/370.22, 84.06, 271, 84.05, 84.04, 264
See application file for complete search history.

(56) References Cited

U.S. PATENT DOCUMENTS

| | | | | | |
|---|---|---|---|---|---|
| 1,259,549 | A | * | 3/1918 | O'Neill | 160/273.1 |
| 1,882,982 | A | * | 10/1932 | Schmiedeskamp | 160/273.1 |
| 2,349,226 | A | * | 5/1944 | Thomas | 160/273.1 |
| 3,116,097 | A | * | 12/1963 | Novales | 312/297 |
| 3,292,685 | A | * | 12/1966 | Clark | 160/26 |
| 3,750,740 | A | * | 8/1973 | Newman | 160/354 |
| 4,499,937 | A | * | 2/1985 | Waine et al. | 160/41 |
| 4,800,946 | A | * | 1/1989 | Rosenoy | 160/264 |
| 4,825,921 | A | * | 5/1989 | Rigter | 160/23.1 |
| 5,123,473 | A | * | 6/1992 | Henkenjohann | 160/264 |
| 5,131,450 | A | * | 7/1992 | Lichy | 160/310 |
| 5,188,160 | A | * | 2/1993 | Jelic | 160/84.02 |
| 6,309,076 | B1 | * | 10/2001 | McVicker | 359/601 |
| 6,394,173 | B2 | * | 5/2002 | Enssle | 160/273.1 |

FOREIGN PATENT DOCUMENTS

| | | |
|---|---|---|
| DE | 197 39 919 | 3/1999 |
| DE | 20 2004 015 857 | 12/2004 |
| DE | 102004005754 A1 | 8/2005 |
| DE | 102005024657 A1 | 6/2006 |
| WO | WO 2006/053520 | 5/2006 |

* cited by examiner

*Primary Examiner* — David Purol
(74) *Attorney, Agent, or Firm* — Fitch, Even, Tabin & Flannery; John M. Naber (57) ABSTRACT

The invention relates to a roller blind arrangement comprising at least one roller blind web (10) and at least one winding tube (12) for winding and unwinding said roller blind web (10), which comprises side edge areas and at least one guiding element (18) which is used for guiding along said side edge areas extending in the direction of the roller blind extension guided in a guide (20). The guiding element(s) are rigidly fixed to the side edge areas of the blind web (10) by means of at least one first seam (30) in such a way that a slipping with respect to said roller blind web (10) is defined.

10 Claims, 9 Drawing Sheets

ROLLER BLIND ARRANGEMENT

This application is a 35 U.S.C. §371 National Stage entry of PCT/DE2006/001485, filed Aug. 24, 2006, which claims priority from German Patent Application No.: DE 10 2005 040 758.7, filed Aug. 26, 2005, the contents of which are herein incorporated by reference.

The present invention relates to a roller blind arrangement and, in particular, to a roller blind arrangement for a vehicle.

Roller blind arrangements for use in vehicle manufacturing are used, for example, as a sunshade below a transparent vehicle bodywork surface or else as a covering for a trunk compartment in a station wagon. Arrangements of this type generally comprise a roller blind web which is wound up at its one end onto a winding tube and which is tensioned by a restoring force of the winding tube. The other end of the roller blind web is usually fastened to a tension bow which can be moved by an electric drive or by hand, as a result of which the roller blind web is correspondingly extended or wound up again.

If, however, the roller blind web on a roller blind arrangement of this type is tensioned only between the tension bow and the winding roller, even given a relatively high tension in this direction, for example if a roof opening is partially opened by the roller blind web, the latter may flutter. Furthermore, the gap which is generally present in the case of embodiments of this type at the border of the roller blind web may also have a visually annoying effect.

In order to overcome these disadvantages, roller blind systems are known, in which the roller blind web is tensioned not only along its extension direction but also transversely with respect thereto.

Figure 1:
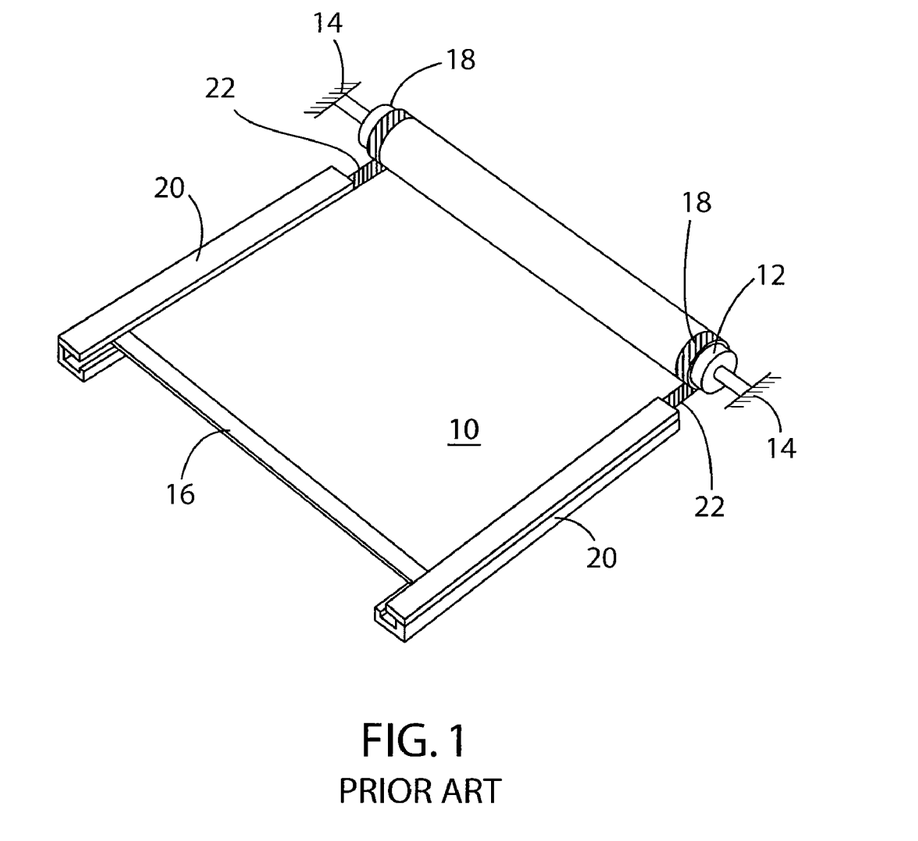
FIG. 1 shows a schematic illustration of a conventional roller blind arrangement.

For this purpose, FIG. 1 shows a conventional roller blind arrangement with a roller blind web 10 which is wound up and unwound by a winding tube 12 and is therefore movable along two guides 20, 20. The winding tube 12 is mounted rotatably by means of bearings 14, 14 fixed on the bodywork and, at that end of the roller blind web 10 which faces away from the winding tube, said roller blind web is fastened to a tension bow 16. A respective guide element 18, 18 is guided in the guides 20, 20 on both sides of the roller blind web 10 and is connected to the roller blind web 10 and can also be wound up together with it onto the winding tube 12. In this case, the guide elements 18, 18 on both sides are guided in the guides 20, 20 in such a manner that, although the roller blind web 10 can emerge from the guide 20 through an opening (not illustrated here specifically), the two guide elements 18, 18 cannot. Given an appropriate distance between the two guides 20, 20 at the two outer edges 22, 22 of the roller blind web 10 in comparison to the width of the roller blind web, the roller blind web itself can now be tensioned transversely with respect to its extension direction in such a manner that, for example, a fluttering of the roller blind web is avoided. This is advantageous in particular if the roller blind web 10 serves to shade a roof opening in the region of a vehicle roof, and the roof opening is partially opened such that a draught can impinge on the roller blind web 10.

Figure 2:
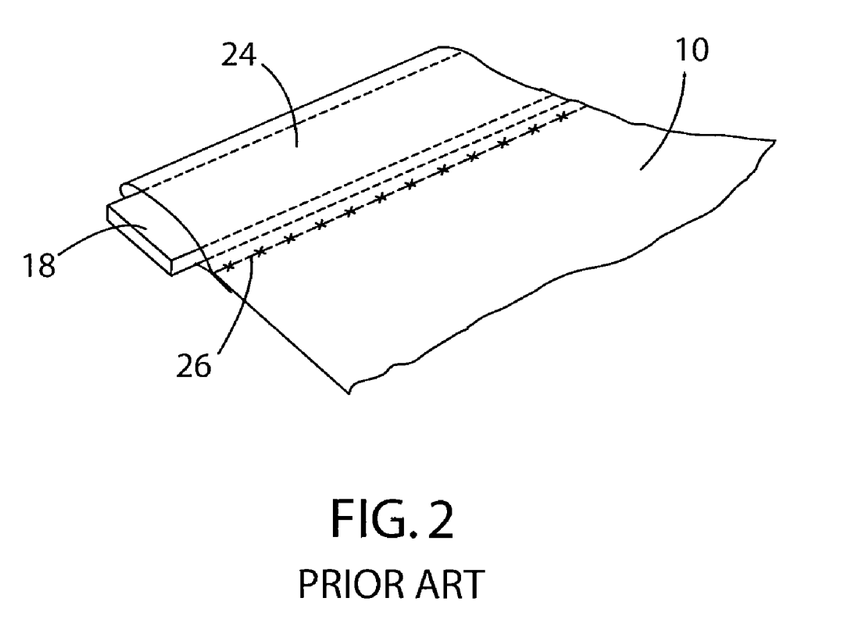
FIG. 2 shows a detailed illustration of the conventional roller blind arrangement illustrated in FIG. 1.

FIG. 2 shows a view of a detail of the roller blind web 10 with a guide element 18. The guide element 18 comprises a flexible flat material, with the flat material 18 being arranged in a pocket 24 formed from the roller blind web 10. In this case, an outer edge 22 along a lateral border region of the roller blind web 10 is turned over toward a central region of the roller blind web 10, with the outer edge 22 then being fastened to the roller blind web 10 by a seam 26.

This gives rise now to the problem of the guide element 18 being freely movable in the pocket 24 and being able to be displaced out of its desired position, which may lead to the problem of the roller blind web not being able to be operated without difficulties.

It is therefore an object of the present invention to provide an improved roller blind arrangement in which slipping of the guide element or of the guide elements is avoided.

This object is achieved according to the features of patent claim 1. Further features refining the invention are contained in the subclaims.

The invention is based on the concept of fixing the guide elements permanently to the roller blind web in the lateral border regions of the roller blind web by a first seam to prevent slipping relative to the roller blind web.

In a further refinement of the invention, lateral outer edges of the roller blind web along the lateral border regions are turned over toward a central region of the roller blind web, wherein the lateral border regions each have a pocket in which the at least one guide element is arranged. This has the advantage that the guide element is protected by the material of the roller blind web.

It is furthermore preferred for the respective outer edge along the lateral border regions to be connected to the roller blind web by at least one second seam. The advantage here is that the pocket is closed laterally and therefore further protection is provided for the guide element.

The guide element is preferably formed from a flexible material. This has the advantage that the guide element can easily be wound up onto the winding tube or unwound from the winding tube.

It is furthermore preferred for the guide element to be formed from a flat material. This firstly facilitates the winding-up and unwinding operations, and secondly the space required for the guide element in the wound-up state is relatively small as a result.

The guide element advantageously has, along its length, a multiplicity of passage openings transversely with respect to the longitudinal direction of the guide element, wherein the first seam runs in each case through the passage openings and regions of the roller blind web which lie opposite the passage openings. This has the advantage that the first seam can be guided in a simple manner by the guide element, and therefore the guide element is fixed relative to the roller blind web.

It is furthermore preferred for the second seam firstly to connect the respective outer edge to the roller blind web and secondly to run through the passage openings of the guide element and those regions of the roller blind web which lie opposite the passage openings. This has the advantage that the seam both laterally closes the pocket and fixes the guide element.

It is furthermore preferred for the first seam to run opposite the second seam both through the passage openings of the guide element and those regions of the roller blind web which lie opposite the passage openings and through roller blind web regions which are adjacent to the guide element. An additional fixing of the guide element by the first seam therefore takes place.

In a further refinement of the invention, the guide element has at least one lateral recess along its length, wherein the first seam runs within the at least one recess and connects together those regions of the roller blind web which directly cover the at least one recess.

In a further refinement of the invention, a multiplicity of fastening elements fastened to the guide element extends transversely with respect to the length of the guide element, said fastening elements extending over the lateral extent of the guide element, and wherein the first seam connects the multiplicity of fastening elements to the roller blind web. In this case, the guide element does not have to have any passage openings or recesses, which simplifies the production and assembly of the roller blind arrangement.

It is furthermore preferred for the fastening elements to comprise adhesive strips. This additionally contributes to the simplification of production and assembly of the roller blind arrangement.

The guide element here is preferably produced from a plastics material or metal material or a combination of both.

Embodiments of the invention are explained in more detail below with reference to drawings, in which.

Figure 3:
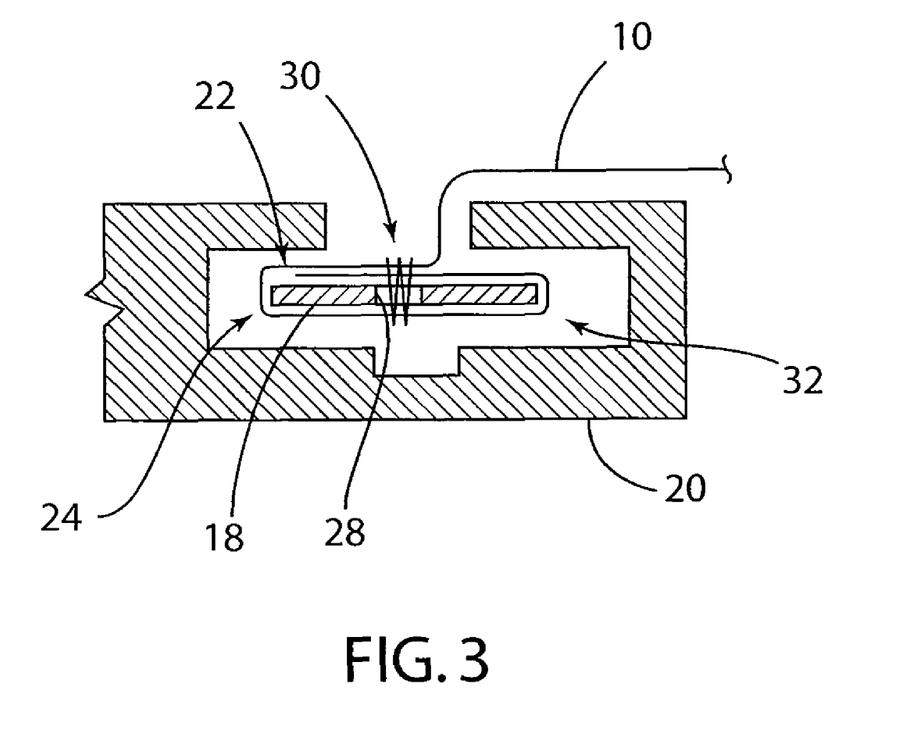
FIGS. 3 and 4 show views of details of a guide of a guide element.

FIG. 3 shows a cross-sectional view of a guide 20 with a guide element 18 arranged therein, the guide element 18 having a passage opening 28 transversely with respect to the longitudinal direction of the guide element. The guide element 18 is surrounded by a lateral border region of the roller blind web 10, the roller blind web forming a pocket 24. As can be seen in the figure, this lateral border region is turned over twice about the guide element 18. Reference number 32 refers here to an edge which is produced by the turning over of the roller blind web. Reference number 22 refers to the outer edge of the roller blind web 10.

A seam 30 runs through the passage opening 28 and through regions of the roller blind web 10 which lie opposite the passage opening 28.

The guide element 18, firstly, is therefore fixed relative to the roller blind web 10 and, secondly, the pocket 24 is fixed by the seam 30 which connects together those regions of the roller blind web 10 which lie opposite the passage opening 28, i.e. are "above" and "below" the passage opening 28.

Figure 5:
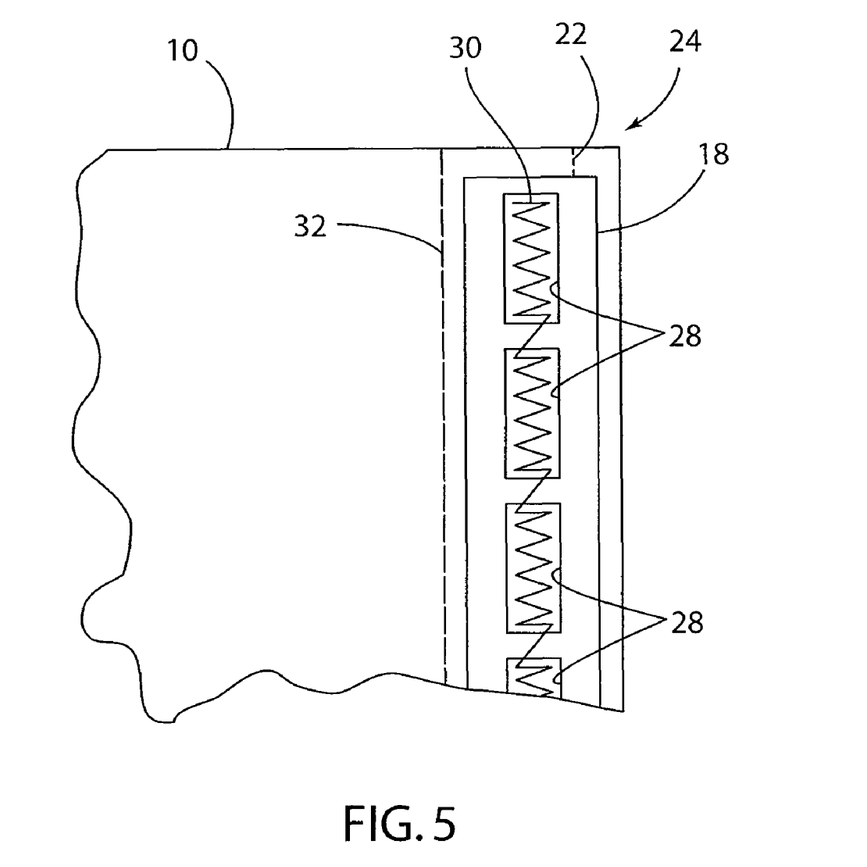
FIGS. 5 to 9 show embodiments of the fixing of the guide element to the roller blind web.

FIG. 5 shows a plan view of the guide element 18 which is illustrated in FIG. 3, with the guide 20 not being illustrated. The guide element 18 is arranged in the pocket 24, the pocket 24 being formed by turning over the lateral border region of the roller blind web 10. The turn-over edge is illustrated in FIG. 5 by reference number 32, and the outer edge of the roller blind web 10 is illustrated by reference number 22.

The passage openings 28 in the guide element 18 can be clearly seen. The passage openings 28 are illustrated here as rectangular openings, but any other form, such as, for example, round, oval, square, etc. is also conceivable. The seam 30 which connects together those regions of the roller blind web 10 which lie directly opposite the passage openings 28 runs in the passage openings 28. In the example illustrated, the seam 30 is a continuous seam, i.e. the seam "jumps" from one passage opening to the next. However, it is also conceivable for a dedicated seam to run in each passage opening and to not be connected to the seam of the adjacent passage opening.

The guide element 18 is therefore permanently fixed to the roller blind web by the seam 30 to prevent slipping relative to the roller blind web 10.

In the example illustrated in FIG. 5, the guide element 18 is composed of spring steel. However, other materials, such as, for example, plastic or else combinations of materials are also conceivable.

Figure 4:
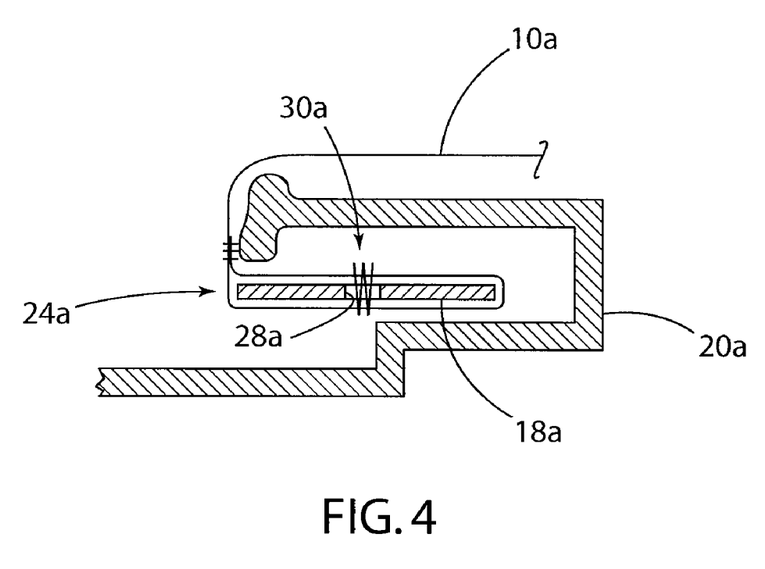

FIG. 4 shows a further embodiment of the invention.

Identical elements are identified here by the same reference numbers but these are identified by a small letter for differentiation purposes.

FIG. 4 shows a cross-sectional view of a guide 20a with a guide element 18a arranged therein, the guide element 18a having a passage opening 28a transversely with respect to the longitudinal direction of the guide element. The guide element 18a is surrounded by a lateral border region of the roller blind web 10a, the roller blind web forming a pocket 24a.

A seam 30a runs through the passage opening 28a and through regions of the roller blind web 10a which lie opposite the passage opening 28a.

Figure 6:
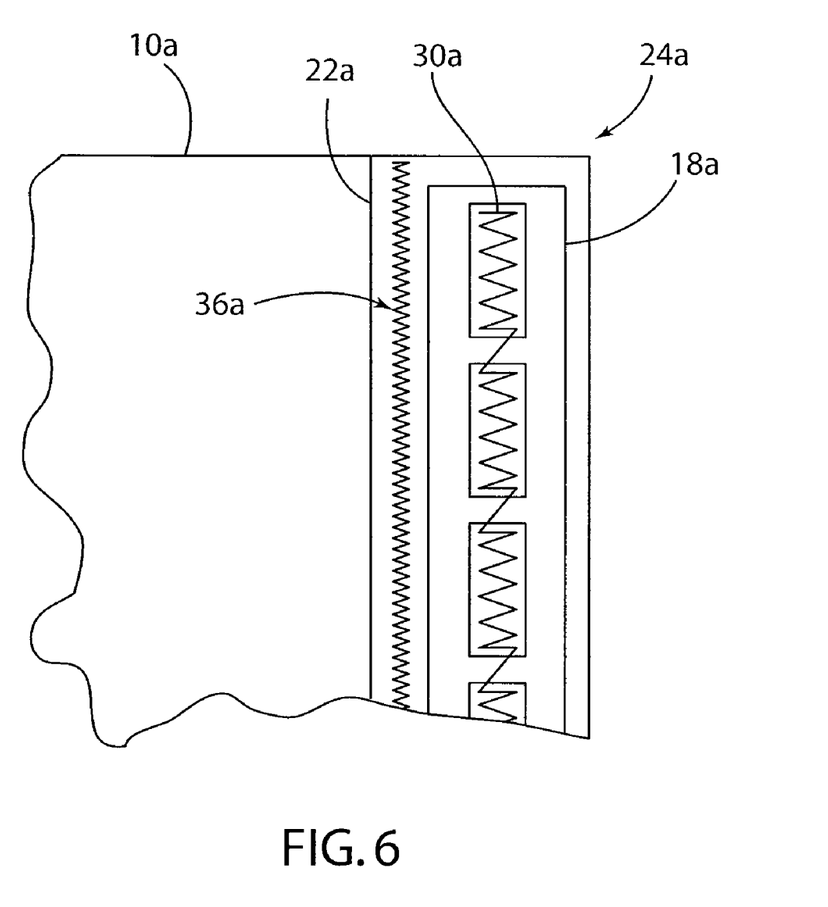

FIG. 6 shows a plan view of the guide element 18a illustrated in FIG. 4, the guide 20a not being illustrated.

In contrast to FIG. 5, the pocket 24a is formed by simple turning over of an outer edge 22a, the outer edge 22a being connected to the roller blind web 10a by a second seam 36a.

Figure 7:
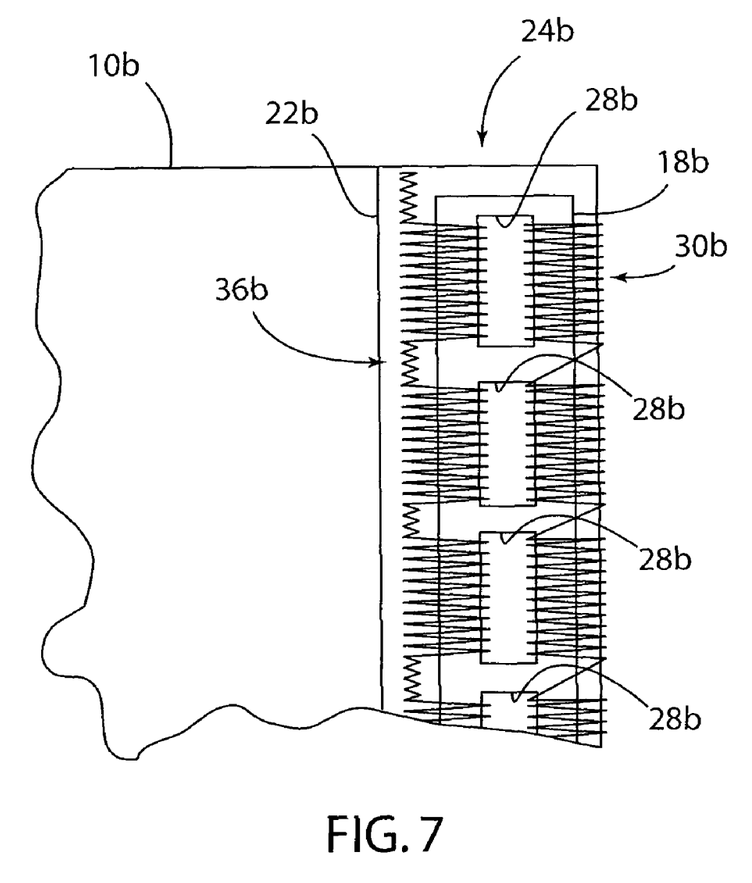

FIG. 7 shows a further embodiment of the invention.

In this case, a seam 36b firstly connects an outer edge 22b to a roller blind web 10b such that a pocket 24b is formed, and, secondly, the seam 36b also fixes a guide element 18b relative to the roller blind web 10b by the seam 36b also running through passage openings 28b. In order to increase the fixing of the guide element 18b even further, a seam 30b which runs both through the passage openings 28b and also through the roller blind web material on the outer region of the roller blind web 10b runs on the side of the guide element 18b which lies opposite the seam 36b.

Figure 8:
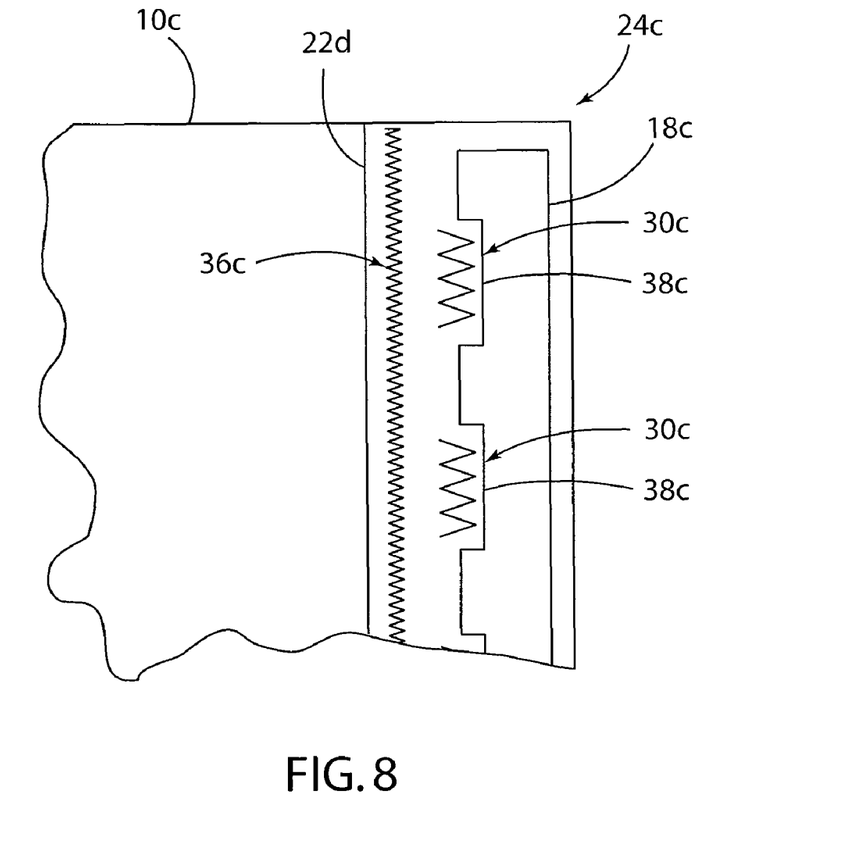

FIG. 8 shows a further embodiment of the invention.

In this case, in contrast to the guide elements illustrated in FIGS. 6 and 7, a guide element 18c does not have any passage openings but, instead, has lateral recesses 38c. A respective seam 30c now runs in said recesses 38c and therefore prevents the guide element 18c from slipping relative to the roller blind web 10c. A further seam 36c connects an outer edge 22c to the roller blind web 10c, thus forming a pocket 24c.

Figure 9:
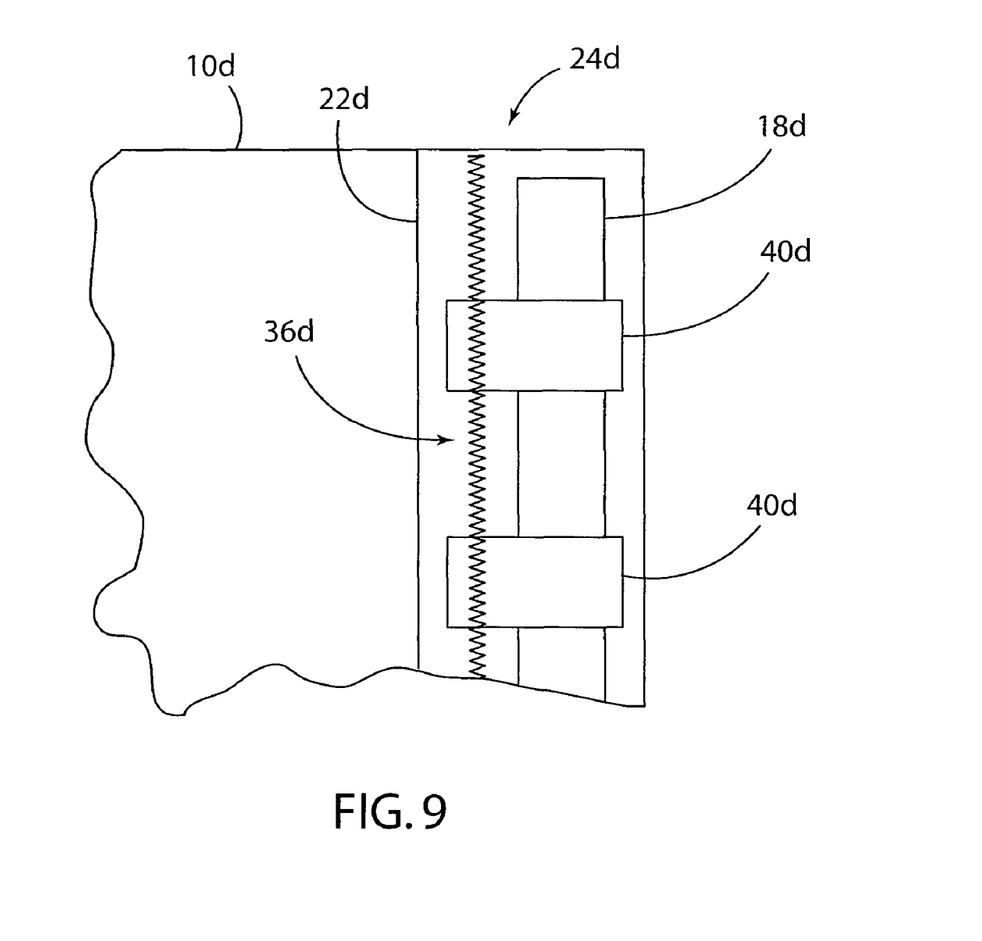

FIG. 9 shows another embodiment of the invention.

In this case, the lateral outer region of a roller blind web 10d forms a pocket 24d by an outer edge 22d being turned over. A guide element 18d which does not have to have any passage openings or recesses is arranged in the pocket 24d. Fastening elements 40d are fastened to the guide element 18d at distances from one another. In the example illustrated, these fastening elements 40d are strips made of plastics material with an adhesive layer, the adhesive layer being connected to a surface of the guide element 18d. However, it is also conceivable that the fastening elements can be turned over around the guide element 18d.

The fastening elements 40d extend away somewhat from the guide element 18d. One seam 36d now connects both the outer edge 22d to the roller blind web 10d and also the fastening elements 40d to the roller blind web 10d. The guide element 18d is therefore fixed relative to the roller blind web 10d, since the fastening elements 40d are connected fixedly to the guide element and the fastening elements 40d are fixed to the roller blind web 10d by the seam 36d.

The invention claimed is:

1. A roller blind arrangement comprising:
   at least one roller blind web and at least one winding tube for winding up and unwinding the roller blind web,
   wherein the roller blind web has lateral border regions,
   wherein at least one of the lateral border regions comprises a pocket having a hollow portion therein and extending along the length of the at least one of the lateral border regions, the hollow portion formed by the at least one of the lateral border regions of the roller blind web turned over toward a central region of the roller blind web and wherein along each of said lateral border regions the roller blind web has at least one flat strip guide element which extends along an extension direction of the roller blind and which is guided in a guide, wherein the at least one guide element is inserted within the hollow portion of the pocket of the at least one of the lateral border regions and permanently fixed to the roller blind web in the lateral border regions of the roller blind web by at least one first seam to prevent slipping relative to the roller blind web and to maintain a planar orientation with the web; and wherein the flat strip guide element has, along its length, a multiplicity of passage openings, and wherein the first seam runs through the multiplicity of passage openings and regions of the roller blind web which lie opposite the passage openings.

2. The roller blind arrangement of claim 1, wherein the respective outer edge along the lateral border regions is connected to the roller blind web by at least one second seam.

3. The roller blind arrangement of claim 1, wherein the guide element is formed from a flexible material.

4. The roller blind arrangement of claim 2, wherein the second seam first connects the respective outer edge to the roller blind web and second runs through passage openings of the guide element and regions of the roller blind web which lie opposite the passage openings.

5. The roller blind arrangement of claim 4, wherein the first seam runs opposite the second seam both through the passage openings of the guide element and regions of the roller blind web which lie opposite the passage openings and through roller blind web regions adjacent to the guide element.

6. The roller blind arrangement of claim 1, wherein the guide element has at least one lateral recess along its length, and wherein the first seam runs within the at least one recess and connects together regions of the roller blind web which directly cover the at least one recess.

7. The roller blind arrangement of claim 1, wherein a multiplicity of fastening elements fastened to the guide element extends transversely with respect to the length of the guide element, said fastening elements extending over the lateral extent of the guide element, and wherein the first seam connects the multiplicity of fastening elements to the roller blind web.

8. The roller blind arrangement of claim 7, wherein the fastening elements comprise adhesive strips.

9. The roller blind arrangement of claim 1, wherein the guide element is produced from a plastics or metal material or a combination of both.

10. The roller blind of claim 1, wherein the multiplicity of passage openings is oriented transversely with respect to the longitudinal direction of the guide element.

\* \* \* \* \*